(12) United States Patent
Olszewski et al.

(10) Patent No.: US 11,887,194 B2
(45) Date of Patent: *Jan. 30, 2024

(54) LIQUIDATION COST CALCULATION

(71) Applicant: Chicago Mercantile Exchange Inc., Chicago, IL (US)

(72) Inventors: Adam Olszewski, London (GB); Dmitriy Glinberg, Northbrook, IL (US); Edmund Li, Chicago, IL (US); Feliks Landa, Glenview, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/681,904

(22) Filed: Feb. 28, 2022

(65) Prior Publication Data

US 2022/0180445 A1 Jun. 9, 2022

Related U.S. Application Data

(63) Continuation of application No. 16/835,860, filed on Mar. 31, 2020, now Pat. No. 11,295,388, which is a
(Continued)

(51) Int. Cl.
*G06Q 40/06* (2012.01)
*G06Q 40/04* (2012.01)

(52) U.S. Cl.
CPC .......... *G06Q 40/06* (2013.01); *G06Q 40/04* (2013.01); *G05B 2219/35211* (2013.01)

(58) Field of Classification Search
CPC .............. G06Q 40/06; G06Q 40/04; G05B 2219/35211
See application file for complete search history.

(56) References Cited

U.S. PATENT DOCUMENTS 7,769,667 B2  8/2010  Glinberg
7,991,671 B2  8/2011  Hadi
(Continued)

FOREIGN PATENT DOCUMENTS

CA  2578051 A1 *  3/2006  ............. G06Q 40/06
CA  2578051 A1     3/2006
(Continued)

OTHER PUBLICATIONS

Deng et al.: Optimizing Portfolio Liquidation Under Risk-based Margin Requirements, Securities Litigation & Consulting Group, Inc. Apr. 2012, pp. 1-2 (Year: 2012).*
(Continued)

*Primary Examiner* — Bijendra K Shrestha
(74) *Attorney, Agent, or Firm* — Lempia Summerfield Katz LLC

(57) ABSTRACT

A set of estimated allocations $N_{est}(X_1)$ through $N_{est}(X_k)$ of portfolio positions to products $X_1$ through $X_k$ may be determined, with products $X_1$ through $X_k$ including portfolio products and spread-traded products based on some of the portfolio products. Utilizing the set of estimated allocations, an optimized liquidation cost $LC_{opt}$ may be designated. Data indicating at least a portion of a performance bond based on the optimized liquidation $LC_{opt}$ may be output.

21 Claims, 8 Drawing Sheets

Related U.S. Application Data continuation of application No. 15/442,194, filed on Feb. 24, 2017, now Pat. No. 10,643,282, which is a continuation of application No. 14/450,632, filed on Aug. 4, 2014, now abandoned.

(56) References Cited

U.S. PATENT DOCUMENTS

| | | | |
|---|---|---|---|
| 7,991,686 B1* | 8/2011 | Stevens | G06Q 40/04 705/37 |
| 2006/0235785 A1 | 10/2006 | Chait | |
| 2009/0171824 A1 | 7/2009 | Glinberg | |
| 2014/0067711 A1* | 3/2014 | Shah | G06Q 40/06 705/36 R |
| 2014/0081820 A1 | 3/2014 | Farabi | |
| 2014/0172748 A1 | 6/2014 | Koblas | |
| 2015/0332403 A1 | 11/2015 | Baysal | |

FOREIGN PATENT DOCUMENTS

| | | | | |
|---|---|---|---|---|
| WO | WO-2009131751 A2 * | 10/2009 | | G06Q 40/00 |
| WO | 2013070567 A2 | 5/2013 | | |
| WO | WO-2013070567 A2 * | 5/2013 | | G06Q 40/06 |

OTHER PUBLICATIONS

McPartland, John W.: Clearing and Settlement of Exchange Traded Derivatives, Oct. 2009, Chicago Fed Letter, The Federal Reserve Bank of Chicago, No. 267, pp. 1-4 (Year: 2009).*

Nilsson, Patrick: Liquidation Strategies in Long-Short Equity Portfolio, Oct. 2011, Department of Mathematics, KTH, Stockholm, pp. 1-57 (Year: 2011).*

CPSS: Payment, Clearing and Settlement Systems in United States, 2012, Redbook, pp. 471-508 (Year: 2012).*

"Cleared OTC FX: Product Overview", CME Group, 2017, 18 pages.

"Interest Rate Swaps: Risk Model", CME Group, 2017, 17 pages.

Acerbi et al.: The Value of Liquidity: Can it be measured? Jun. 2010, RiskMetrics Group, pp. 1-20. (Year: 2010).

Aleksandrov et al.: Liquidity modeling and optimum liquidation in bond market, Feb. 6, 2010, pp. 1-25. (Year: 2010).

Berry-Stolzle, T.:Evaluating liquidation strategies for insurance companies, Apr. 2005, pp. 1-39 (Year: 2005).

Deng et al.,: Optimizing Portfolio Liquidation under Risk-based Margin Requirements, Securities Litigation & Consulting Group, Inc., Apr. 6, 2012, pp. 1-26. (Year: 2012).

Kapoor, V.: Cost incurred in liquidation to provide framework to access the delta achieved by liquidation manager, 2012, Navigant Consulting, pp. 1-4. (Year: 2012).

McPartland, John W.: Clearing and Settlement of Exchange Traded Derivatives, Oct. 2009, Chicago Fed Letter, Federal Reserve Bank of Chicago, No. 267, pp. 1-4. (Year: 2009)

* cited by examiner

LIQUIDATION COST CALCULATION

REFERENCE TO RELATED APPLICATIONS

This application is a continuation under 37 C.F.R. § 1.53(b) of U.S. patent application Ser. No. 16/835,860 filed Mar. 31, 2020, now U.S. Pat. No. 11,295,388, which is a continuation under 37 C.F.R. § 1.53(b) of U.S. patent application Ser. No. 15/442,194 filed Feb. 24, 2017, now U.S. Pat. No. 10,643,282, which is a continuation under 37 C.F.R. § 1.53(b) of U.S. patent application Ser. No. 14/450,632, filed Aug. 4, 2014, now abandoned, the entire disclosures of all of the above applications are hereby incorporated by reference and relied upon.

BACKGROUND

In many financial markets, holders of positions in traded assets are required to maintain a minimum balance of cash or other assets as a performance bond. This performance bond may be used to reduce the risk to other market participants of losses associated with the position holder failing to fulfill its obligations. If a holder of a portfolio goes bankrupt or otherwise defaults, the performance bond for that portfolio can be used to reduce losses resulting from the holder no longer being able to cover its positions. It is desirable to a base performance bond requirement for a portfolio on an accurate estimate of amounts that might be recoverable when liquidating that portfolio. However, attempting to liquidate a large position in a particular financial product can itself significantly affect the market for that product. As a result, estimating liquidation recovery becomes more difficult as position sizes increase. There remains a need for improved systems and techniques to calculate a performance bond value that better accounts for liquidation costs.

SUMMARY

This Summary is provided to introduce a selection of concepts in a simplified form that are further described below in the Detailed Description. This Summary is not intended to identify key features or essential features of the invention.

In some embodiments, portfolio data may be accessed. That portfolio data may define, for each of a plurality of outright-traded products, a portfolio position in the outright-traded product. Data defining a liquidation set of products $X_1$ through $X_k$ may be identified. The products $X_1$ through $X_k$ may include the plurality of outright-traded products and further include one or more spread-traded products, each of the spread-traded products may represent a combination of two or more of the outright-traded products, and each of the products $X_1$ through $X_k$ may respectively correspond to one of cost functions $C_1$ through $C_k$ for estimating a liquidation cost based on notional value. A set of estimated allocations $N_{est}(X_1)$ through $N_{est}(X_k)$ of the portfolio positions to products $X_1$ through $X_k$ may be identified. Calculations may be performed, utilizing the estimated allocations $N_{est}(X_1)$ through $N_{est}(X_k)$, to determine a set of allocations $N(X_1)$ through $N(X_k)$ corresponding to a liquidation cost LC that is less than a liquidation cost $LC_{est}$ corresponding to the set of estimated allocations. An optimized liquidation cost $LC_{opt}$ may be designated. Data indicating at least a portion of a performance bond based on the optimized liquidation $LC_{opt}$ may be output.

Embodiments include, without limitation, herein-described methods for processing data associated with liquidation costs and/or performance bonds, computer systems configured to perform such methods, and non-transitory computer-readable media storing instructions executable by a computer system to perform such methods.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Various embodiments may comprise a method, a computer system, and/or a computer program product. Accordingly, one or more aspects of one or more of such embodiments may take the form of an entirely hardware embodiment, an entirely software embodiment, and/or an embodiment combining software and hardware aspects. Furthermore, such aspects may take the form of a computer program product stored by one or more non-transitory computer-readable storage media having computer-readable program code, or instructions, embodied in or on the storage media. The term "computer-readable medium" or "computer-readable storage medium" as used herein includes not only a single medium or single type of medium, but also a combination of one or more media and/or types of media. Such a non-transitory computer-readable medium may store computer-readable instructions (e.g., software) and/or computer-readable data (i.e., information that may or may not be executable). Any suitable computer readable media may be utilized, including various types of non-transitory computer readable storage media such as hard disks, CD-ROMs, optical storage devices, magnetic storage devices, FLASH memory, and/or any combination thereof. The term "computer-readable medium" or "computer-readable storage medium" could also include an integrated circuit or other device having hard-coded instructions (e.g., logic gates) that configure the device to perform one or more operations.

Aspects of method steps described in connection with one or more embodiments may be executed by one or more processors associated with a computer system (such as exchange computer system 100 described below). As used herein, a "computer system" could be a single computer or could comprise multiple computers. When a computer system comprising multiple computers performs a method, various steps could be performed by different ones of those multiple computers. Processors of a computer system may execute computer-executable instructions stored on non-transitory computer-readable media. Embodiments may also be practiced in a computer system forming a distributed computing environment, with tasks performed by remote processing devices that are linked through a communications network. In a distributed computing environment, program modules may be located in both local and remote computer storage media including memory storage devices.

Exemplary Operating Environment

Figure 1:
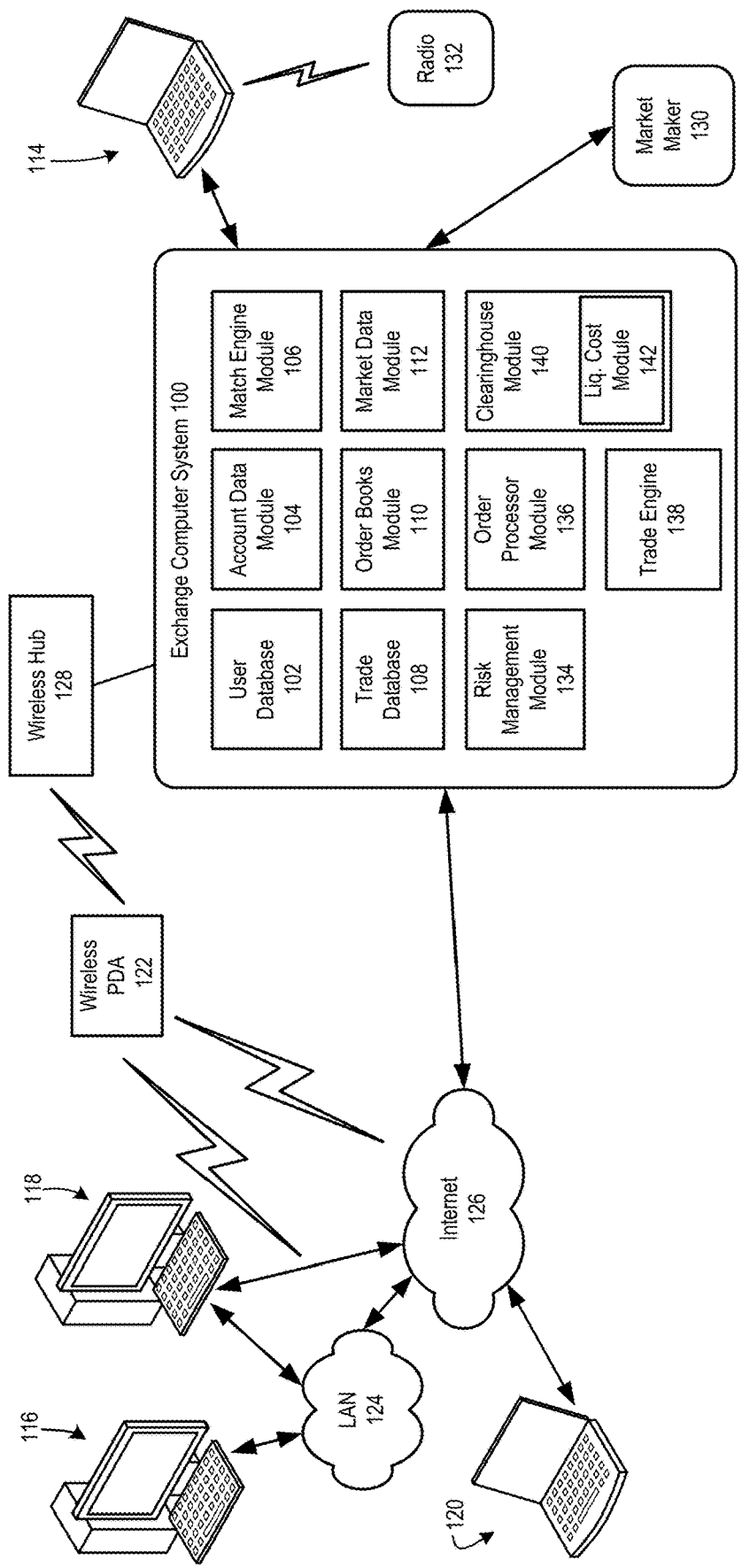
FIG. 1 shows an exemplary trading network environment for implementing trading systems and methods according to at least some embodiments.

Aspects of at least some embodiments can be implemented with computer systems and computer networks that allow users to communicate trading information. An exemplary trading network environment for implementing systems and methods according to at least some embodiments is shown in FIG. 1. The implemented systems and methods can include systems and methods, such as are described herein, that facilitate data processing and other activities associated with determination of liquidation costs and performance bonds based at least in part on such liquidation costs.

Computer system 100 can be operated by a financial product exchange and configured to perform operations of the exchange for, e.g., trading and otherwise processing data relating to various financial products. Financial products of the exchange may include, without limitation, futures contracts, options on futures contracts, other types of options, and other types of derivative contracts. Financial products traded or otherwise processed by the exchange may also include over-the-counter (OTC) products such as OTC forwards, OTC options, OTC swaps, etc. Financial products traded through the exchange may also or alternatively include other types of financial interests, including without limitation stocks, bonds and/or other securities (e.g., exchange traded funds), foreign currencies, and spot market trading of commodities. In at least some embodiments, and as explained in more detail below, financial products traded and/or otherwise processed through exchange computer system 100 include financial products in a portfolio for which a liquidation cost and performance bond are being calculated.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options, and other derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of exchange computer system 100 and configured to carry out operations of a clearinghouse of the exchange that operates computer system 100. Module 140 may receive data from and/or transmit data to trade database 108 and/or other modules of computer system 100, including liquidation cost determination module 142, regarding trades of futures contracts, futures contracts options, and other financial products traded through the exchange that operates system 100. Clearinghouse module 140 may facilitate the financial product exchange (or a clearinghouse of the exchange) acting as one of the parties to every traded contract or other product. For example, computer system 100 may match an offer by party A to sell a futures contract, an option or another exchange-traded financial product with a bid by party B to purchase a like exchange-traded financial product. Module 140 may then create an exchange-traded financial product between party A and the exchange clearinghouse and a second exchange-traded financial product between the exchange clearinghouse and party B. Module 140 may similarly create offsetting contracts when creating contracts as a result of an option exercise and/or may select option grantors to fulfill obligations of exercising option holders. Module 140 may also be configured to perform other clearinghouse operations. As a further example, module 140 may maintain performance bond data with regard to clearing members and/or trading customers. As part of such operations, module 140 may store and maintain data regarding the values of various options, futures contracts, and other interests, determine mark-to-market and final settlement amounts, confirm receipt and/or payment of amounts associated with performance bond accounts, confirm satisfaction of delivery and other final settlement obligations, etc.

Clearinghouse module 140 may include a liquidation cost determination module 142. Module 142 may generate, store, and process data associated with liquidation costs for portfolios. Various operations performed by module 142 in at least some embodiments are further described below.

Each of modules 102 through 142 could be implemented as separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-142). When one or more of modules 102 through 142 are implemented as separate computers in a networked environment, those computers may be part of a local area network, a wide area network, and/or multiple interconnected local and/or wide area networks.

Exchange computer system 100 may also communicate in a variety of ways with devices that may be logically distinct from computer system 100. For example, computer device 114 is shown directly connected to exchange computer system 100. Exchange computer system 100 and computer device 114 may be connected via a T1 line, a common local area network (LAN), or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124 and may communicate with exchange computer system 100 via LAN 124. LAN 124 may implement one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics, radio links, or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish, or any other device for connecting a computer device to the Internet. Computers 116, 118, and 120 may communicate with each other via the Internet 126 and/or LAN 124.

One or more market makers 130 may maintain a market by providing constant bid and offer prices for a derivative or security to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems, regulatory systems, and fee systems.

The operations of computer devices and systems shown in FIG. 1 and described herein may be controlled by computer-executable instructions stored on one or more non-transitory computer-readable media. For example, computer device 116 may include computer-executable instructions for receiving market data from exchange computer system 100 and displaying that information to a user. As another example, module 140 and/or module 142 and/or other modules of exchange computer system 100 may include one or more non-transitory computer-readable media storing computer-executable instructions for performing herein-described operations associated with liquidation cost data and/or performance bond data.

Of course, numerous additional servers, computers, hand-held devices, personal digital assistants, telephones, and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

In at least some embodiments, exchange computer system 100 (or "computer system 100") receives, stores, generates, and/or otherwise processes liquidation cost and performance bond data, as described herein, for one or more portfolios. In the following description of some embodiments, some or all of these operations may be performed by clearinghouse module 140 (including liquidation cost module 142) of computer system 100. In other embodiments, however, some or all of these operations may be performed by other modules of computer system 100 and/or by modules of one or more other computer systems. In some embodiments, for example, clearinghouse operations may be performed by one or more computer systems separate from an exchange computer system, with one or more of the operations described herein performed by those one or more separate computer systems.

As used herein, "portfolio" refers to a collection of positions that the portfolio holder possesses with regard to one or more products. Products may include, without limitation, OTC foreign currency (FX) forwards, other types of OTC forwards, OTC swaps, futures, options and other products described above. As used herein, "product" refers to a category of contracts or other type of arrangement that have similar terms. For example, product $Y_1$ might be a type of OTC forward contract requiring delivery of 1,000,000 US dollars on future date $D_1$ in return for a negotiated contractual price designated in Euros. Product $Y_2$ might also be a type of OTC forward contract requiring delivery of 1,000,000 US dollars in return for a negotiated contractual price designated in Euros, but having a different delivery date $D_2$. A product is distinguished from individual instances of that product. For example, an instance of product $Y_1$ would be a single OTC forward contract.

"Position" refers to the amount by which a particular product may be represented in a portfolio. Typically, a position in a particular product is quantified based on some multiple of a notional value for that product. For example, product $Y_1$ might be treated as having a notional value of $1,000,000US. A portfolio that includes identical interests in five such contracts would thus have a position of $5,000,000US in product $Y_1$. Notional values may be defined in other ways for other types of products. A notional need not be a quantity of a currency.

A position in a product is further characterized by a side of the transaction corresponding to the product in question. In an OTC forward contract or in a futures contract, for example, a "long" position corresponds to the side of the transaction obligated to pay the contract price and receive the underlying contract subject matter (or "underlying") at a contractually-designated time. A "short" position corresponds to the side of the transaction obligated to deliver the underlying and receive the contract price at the contractually-designated time. Continuing the previous example, if the portfolio holder has long interests in the five product $Y_1$ contracts, and if each of those five contracts has the same contract price of 734,000 Euros, the portfolio holder would be obligated to pay 3,670,000 (5×734,000) Euros on date $D_1$ and to receive a total of $5,000,000US. If the portfolio holder has short interests in the five $Y_1$, the portfolio holder would be obligated to deliver a total of $5,000,000US on date $D_1$ and to receive 3,670,000 Euros.

Notional value is distinct from market value. Continuing a previous example, a portfolio holder may enter into a $Y_1$ contract at price P. On a subsequent date D, with D being after execution of the $Y_1$ contract but prior to $D_1$, market forces may have caused the exchange rate for Euros and dollars to change. If the portfolio holder wishes to close out that contract (e.g., by obtaining an offsetting interest in another $Y_1$ contract), the contract price of that offsetting contract may differ from P by an amount ΔP (which may be positive or negative).

Products may include products that are traded outright, as well as products traded as a spread. A spread-traded product, in effect, represents a combination of outright-traded products. Continuing an earlier example, product $Y_1$ is traded outright, i.e., is "outright-traded." A party wishing to have a $Y_1$ position may enter into one or more instances of product $Y_1$ by negotiating for entry into $Y_1$ contracts only. Product $Y_2$ is similarly outright-traded. Products $Y_1$ and $Y_2$ may also form components (or "leg products") of another product $Y_3$ that is spread-traded. For example, product $Y_3$ may be defined as a type of combination that includes a long position in a $Y_1$ contract and a short position in a $Y_2$ contract ($LY_1$-$SY_2$) or a short position in a $Y_1$ contract and a long position in a $Y_2$ contract ($SY_1$-$LY_2$). A spread-traded product may have more than two leg products. A position in a spread-traded product may also be characterized as long or short. Because a spread-traded product includes a combination of long and short positions in the leg products, however, the definition of the long and short position may vary.

A spread-traded product may be traded as a combination of its leg products. After executing such a trade, however, there are separate portfolio positions in each of the leg products. For example, spread-traded products may be traded by quoting a price that represents a difference between the prices of the individual leg products. A party wishing to acquire a position in a $Y_3$ product might agree to do so at a price $P_{spr}$ representing a difference between the price of a long interest in a $Y_1$ contract and a short interest in a $Y_2$ contract. Once that trade is executed, the portfolio of that party then includes a long position in product $Y_1$ and a short position in product $Y_2$.

When liquidating a large portfolio (e.g., upon default a large institutional investor), it may be necessary to either buy out or acquire offsetting positions for all positions in the portfolio. However, a sudden purchase or sale of a large interest in a particular product can significantly affect the market and cause prices for that product to be higher or lower than they might otherwise be. This effect on price, also known as liquidation cost, can be considered a portion of a large portfolio position value that may be lost because of a need to liquidate that position in a market that is abnormally depressed or inflated because of the sudden availability of that large position in the market. Liquidation cost for a particular product can be approximated as a function C(N( )), where "N( )" represents the total notional value of a position in that product. A liquidation cost function can normally be generated by polling brokers and/or other market participants and obtaining sample prices for different sized positions in a particular product. The resulting data can then be converted into a function using conventional curve fitting techniques. For example, a cost function for a product X may take the form shown in Equation 1.

$$C(N(X)) = a * \left( b + d * e^{\frac{-(N(X))^2}{d}} \right) \quad \text{Equation 1}$$

In Equation 1, "e" is Euler's constant and a, b and d are constants determined by curve fitting to the sample data. Because liquidation cost normally increases for increasing notional value, a, b and d typically have values such that a*b is positive and a*d is negative.

For a portfolio having positions in k products, the liquidation cost is the sum of the liquidation costs of each component. This can be represented as shown by Equation 2.

$$LC = \sum_{j=1}^{k} C_i(N(X_i)) \quad \text{Equation 2}$$

In Equation 2, "LC" is the liquidation cost for the portfolio, "$N(X_i)$" is the total notional of the portfolio position in the $i^{th}$ product, and "$C_i( )$" is the liquidation cost function for the $i^{th}$ product.

Determining an accurate liquidation cost for a portfolio is more complex than is suggested by Equation 2, however. In practice, a liquidation cost for a spread-traded product is less than the liquidation costs of the outright trading of the leg products. To illustrate using a previous examples, assume that a portfolio includes a $500 million long position in product $Y_1$ ($500 M $LY_1$) and a $500 million short position in product $Y_2$ ($500 M $SY_2$). This is equivalent to a $500 million position in a $Y_3$ product having $Y_1$ and $Y_2$ leg products. The cost of liquidating the $Y_1$ and $Y_2$ positions as outright-traded products may be significantly more than liquidating those positions as an $LY_1$-$SY_2$ $Y_3$ spread. Stated differently, and if $C_{Y1}$, $C_{Y2}$ and $C_{Y3}$ are the liquidation cost functions for products $Y_1$, $Y_2$ and $Y_3$, respectively, then $C_{Y3}$ ($500 M)<$C_{Y1}$ ($500 M)+$C_{Y2}$ ($500 M). Moreover, there may be multiple spread-traded products into which a particular group of portfolio positions could be allocated. Each of those multiple spread-traded products may have a different cost function, so different allocations can result in significantly different total liquidation costs.

Figure 2:
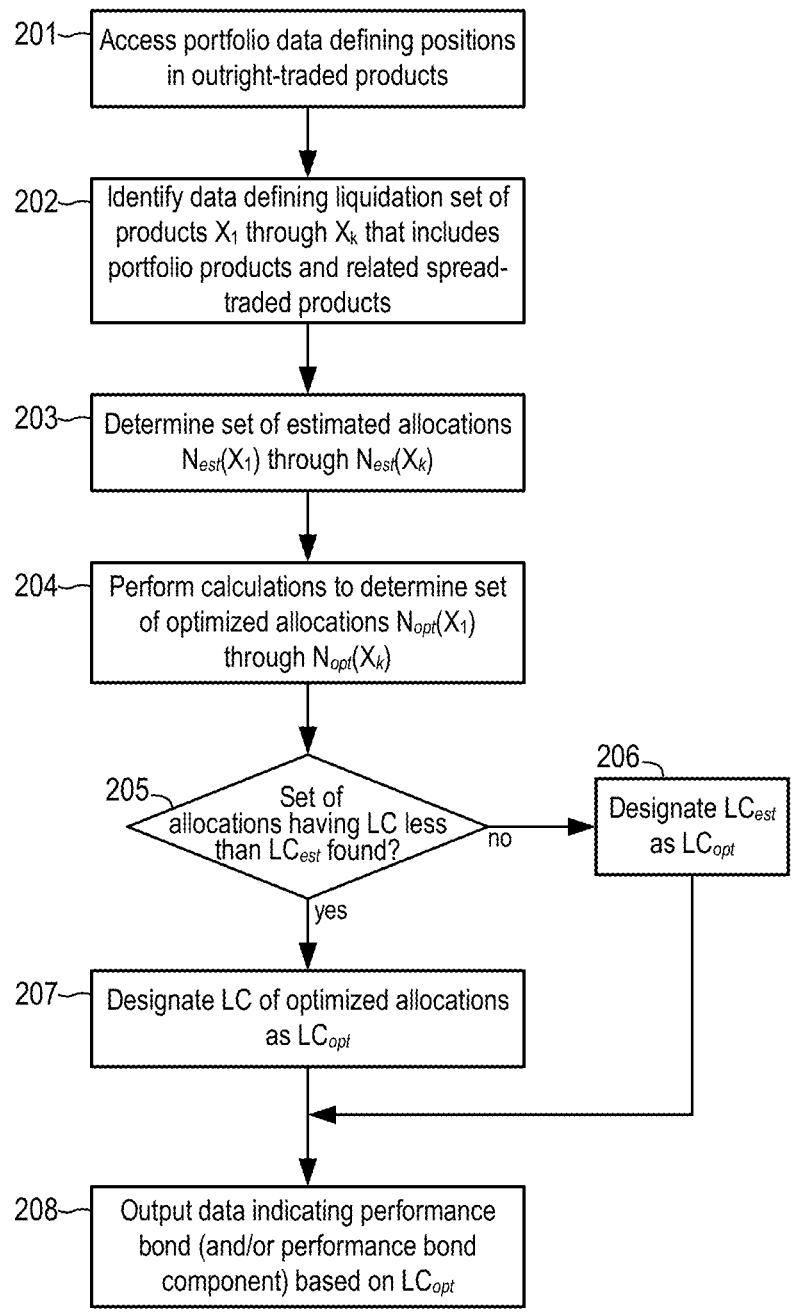
FIG. 2 is a flow chart of a method according to some embodiments.

FIG. 2 is a flow chart of a method according to some embodiments The method of FIG. 2 predicts a total liquidation cost for a portfolio and then generates and outputs data indicating a performance bond (or a performance bond component) based on that predicted liquidation cost. Operations corresponding to the steps in FIG. 2 may be carried out by modules 140 and 142 of computer system 100 or by another computer system.

In step 201, computer system 100 accesses data associated with a subject portfolio for which a performance bond amount is being determined. In some embodiments the accessed data may include, for each of multiple products represented in a portfolio ("portfolio products"), a total notional value of the portfolio position in that product and an indication of whether that position is short or long. As but one example, the accessed data for a portfolio of j products $X_1$ through $X_j$ could take the form of an array similar to Data Array 1.

$$\text{Data Array 1:} \begin{Bmatrix} X_1 & N_P(X_1) & [\text{side}] \\ \vdots & \vdots & \vdots \\ X_j & N_P(X_j) & [\text{side}] \end{Bmatrix}$$

In Data Array 1, each row corresponds to a different one of the portfolio products. The first element in each row is an identifier of the portfolio product to which the row corresponds. The second element in the row is the total notional value of the portfolio position in that product (e.g., $N_P(X_1)$ is the total notional value of the portfolio position in product $X_1$). The third element in each row is an indicator of what side the position may be (i.e., long or short). An example of Step 201 is further discussed in connection with FIG. 3.

In step 202, computer system 100 identifies data that defines a liquidation set of products. The liquidation set may include the portfolio products, but may additionally include spread-traded products that represent combinations of the portfolio products, i.e., products that include some of the portfolio products as leg products. As but one example, the identified data could take the form of an array similar to Data Array 2.

$$\text{Data Array 2:} \begin{Bmatrix} X_1 & \text{[outright]} \\ \vdots & \vdots \\ X_j & \text{[outright]} \\ X_{j+1} & \text{[leg products]} \\ \vdots & \vdots \\ X_k & \text{[leg products]} \end{Bmatrix}$$

The data in rows 1 through j of Data Array 2 correspond to the same portfolio products represented in Data Array 1. Each of rows 1 through j includes an identifier of for one of the portfolio products and data indicating that the product is outright-traded. Each of the subsequent rows j+1 through k of Data Array 2 corresponds to a different one of spread-traded products $X_{j+1}$ through $X_k$. Each of those spread-traded products includes two or more of the portfolio products as leg products. Each of rows j+1 through k includes an identifier of the corresponding spread-traded product and data indicating the leg products. If, for example, product $X_{j+1}$ is a type of spread comprising a position in an $X_1$ product and an opposite position in an $X_2$ product, the "leg products" description data might indicate "$LX_1$-$SX_2$ or $SX_1$-$LX_2$," or simply "$X_1$-$X_2$" if it is understood that all of the spread-traded products involve opposite interests in adjacent legs.

As part of step 202, computer system 100 may identify data that defines liquidation cost functions for each of the products in the liquidation set. As but one example, the identified data could take the form of an array similar to Data Array 3.

$$\text{Data Array 3:} \begin{Bmatrix} C_1 \\ \vdots \\ C_j \\ C_{j+1} \\ \vdots \\ C_k \end{Bmatrix}$$

Each element in Data Array 3 represents a liquidation cost function for one of the products in the liquidation set of Data Array 3, e.g., "$C_1$" is the liquidation cost function for product $X_1$. Although the example of Data Arrays 1, 2 and 3 suggests at least three portfolio products and at least three spread-traded products, this need not be the case. An example of step 202 is further discussed in connection with FIG. 4.

In step 203, computer system 100 determines a set of estimated allocations of the portfolio positions among the products of the liquidation set. This set of estimated allocations is subsequently used as an approximation to help narrow a search for an optimized allocation in step 204. In some embodiments, and as described below in connection with FIGS. 5 and 6, the estimation of step 203 may comprise ordering the spread-traded products in the liquidation set based on the cost functions corresponding to the spread-traded products, progressing through each of the ordered spread-traded products and allocating the portfolio positions to hypothetical trades in the spread-traded products to the maximum extent possible, and allocating any remainder of the portfolio positions to hypothetical outright trades. In other embodiments, and as described below in connection with FIGS. 7 and 8, the estimation of step 203 may comprise generating multiple search trees, with each of the search trees having multiple branches, determining a set of allocations and a liquidation cost corresponding to each of at least a portion of the branches in each of the search trees, and selecting the set of allocation corresponding to the lowest liquidation cost.

In step 204, and as discussed in further detail below, computer system 100 performs calculations to determine a set of optimized allocations of the subject portfolio positions among the liquidation set products. The set of estimated allocations from step 203 may be used in step 204. In step 205, computer system 100 determines whether it was able to find a set of allocations having a liquidation cost LC that is less than the liquidation cost $LC_{est}$ corresponding to the set of estimated allocations from step 203. If not, $LC_{est}$ is designated as $LC_{opt}$ in step 206 and computer system 100 proceeds to step 208. If a set of allocations was found, the liquidation cost LC is designated as $LC_{opt}$ and computer system 100 proceeds to step 208. In step 208, computer system 100 calculates a performance bond amount (or an amount of a performance bond component) and outputs data indicative of that performance bond amount (or component). Based on that output data, a determination might be made with regard to whether the holder of the subject portfolio has sufficient funds or other assets on account to cover potential losses. If necessary, additional funds can be collected.

In some embodiments, step 208 may comprise calculating a first performance bond component based on the optimized liquidation cost and a second performance bond component calculated in another manner (e.g., based on market value of the portfolio without consideration of liquidation cost). In some such embodiments, the liquidation cost component may be a predetermined percentage of the liquidation cost and the market value component may be a predetermined percentage of the portfolio market value exclusive of liquidation cost.

To further assist in describing operations according to certain embodiments, Table 1 provides a hypothetical portfolio P1 for use in subsequent examples.

TABLE 1

| Hypothetical Portfolio P1 | | |
|---|---|---|
| product | total notional (×$1,000,000 US) | position side |
| $X_1$ | 1200 | Long |
| $X_2$ | 800 | Short |
| $X_3$ | 500 | Short |
| $X_4$ | 750 | Long |

TABLE 1-continued

Hypothetical Portfolio P1

| product | total notional (×$1,000,000 US) | position side |
|---|---|---|
| $X_5$ | 600 | Short |
| $X_6$ | 1000 | Long |

As seen in Table 1, portfolio P1 includes positions in products $X_1$ through $X_6$. Each of products $X_1$ through $X_6$ is an outright-traded product such as an OTC FX forward contract. For simplicity, it is assumed that each of these products has a defined notional value of $1,000,000US, i.e., that the notional value of a single product instance is $1,000,000. Thus, for example, the $1.2 billion long position in product $X_1$ represents long positions in 1200 instances of the $X_1$ product, the $800 million short position in product $X_2$ represents short positions in 800 instances of the $X_2$ product, etc. Products represented in a portfolio may have different defined notionals. Normally, however, a portfolio position in a particular product will be an integer multiple of the defined notional of that product.

Figure 3:
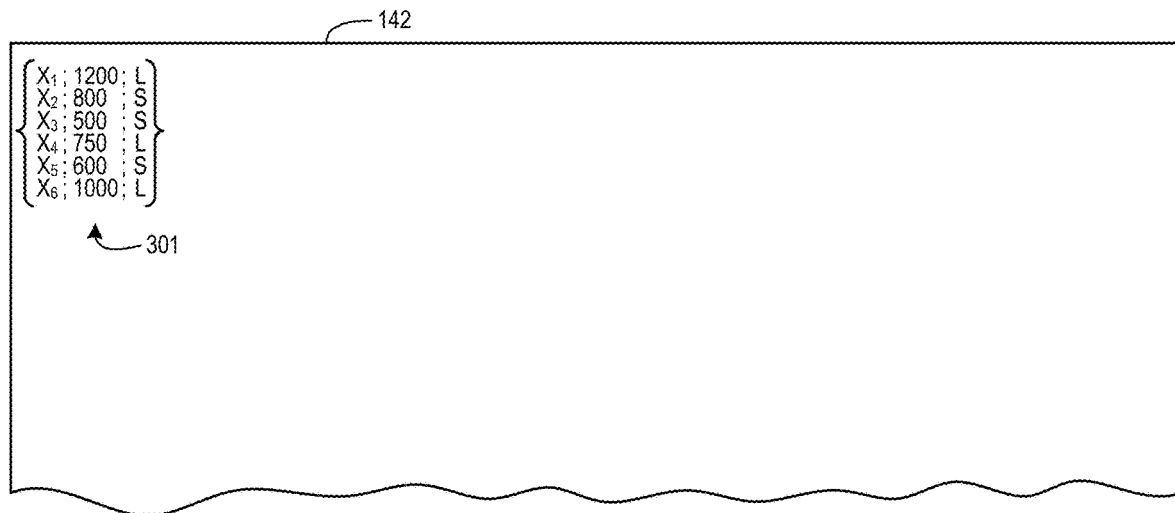
FIGS. 3 and 4 show states of a computer system module after performing certain steps of the method of FIG. 2.
Figure 4:
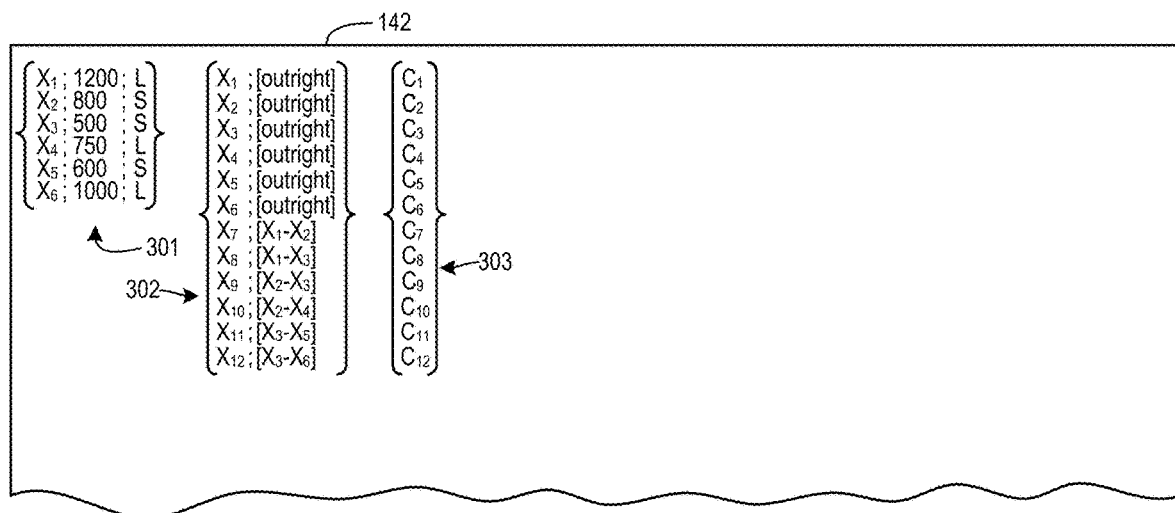

FIG. 3 shows module 142 of computer system 100 at the completion of step 201 of FIG. 2, where module 142 has accessed data 301 that defines the positions of portfolio P1. In particular, data 301 identifies the products represented in portfolio P1, sizes of the positions in the products, and the nature of each position (long or short). FIG. 4 shows module 142 at the completion of step 202 of FIG. 2, where module 142 has identified data 302 that defines a liquidation set. In the present example, the liquidation set includes outright-traded portfolio products $X_1$-$X_6$, as well as six spread-traded products $X_7$-$X_{12}$. Each of spread-traded products $X_7$-$X_{12}$ includes two of portfolio products $X_1$-$X_6$ as its leg products, as shown in Table 2 and in FIG. 4.

TABLE 2

| product | leg products |
|---|---|
| $X_7$ | $X_1$-$X_2$ ($LX_1$-$SX_2$ or $SX_1$-$LX_2$) |
| $X_8$ | $X_1$-$X_3$ ($LX_1$-$SX_3$ or $SX_1$-$LX_3$) |
| $X_9$ | $X_2$-$X_3$ ($LX_2$-$SX_3$ or $SX_2$-$LX_3$) |
| $X_{10}$ | $X_2$-$X_4$ ($LX_2$-$SX_4$ or $SX_2$-$LX_4$) |
| $X_{11}$ | $X_3$-$X_5$ ($LX_3$-$SX_5$ or $SX_3$-$LX_5$) |
| $X_{12}$ | $X_3$-$X_6$ ($LX_3$-$SX_6$ or $SX_3$-$LX_6$) |

As further shown in FIG. 4, module 142 has also accessed data 303 that defines liquidation cost functions $C_1$ through $C_{12}$ that respectively correspond to products $X_1$ through $X_{12}$ in the liquidation set.

Figure 5:
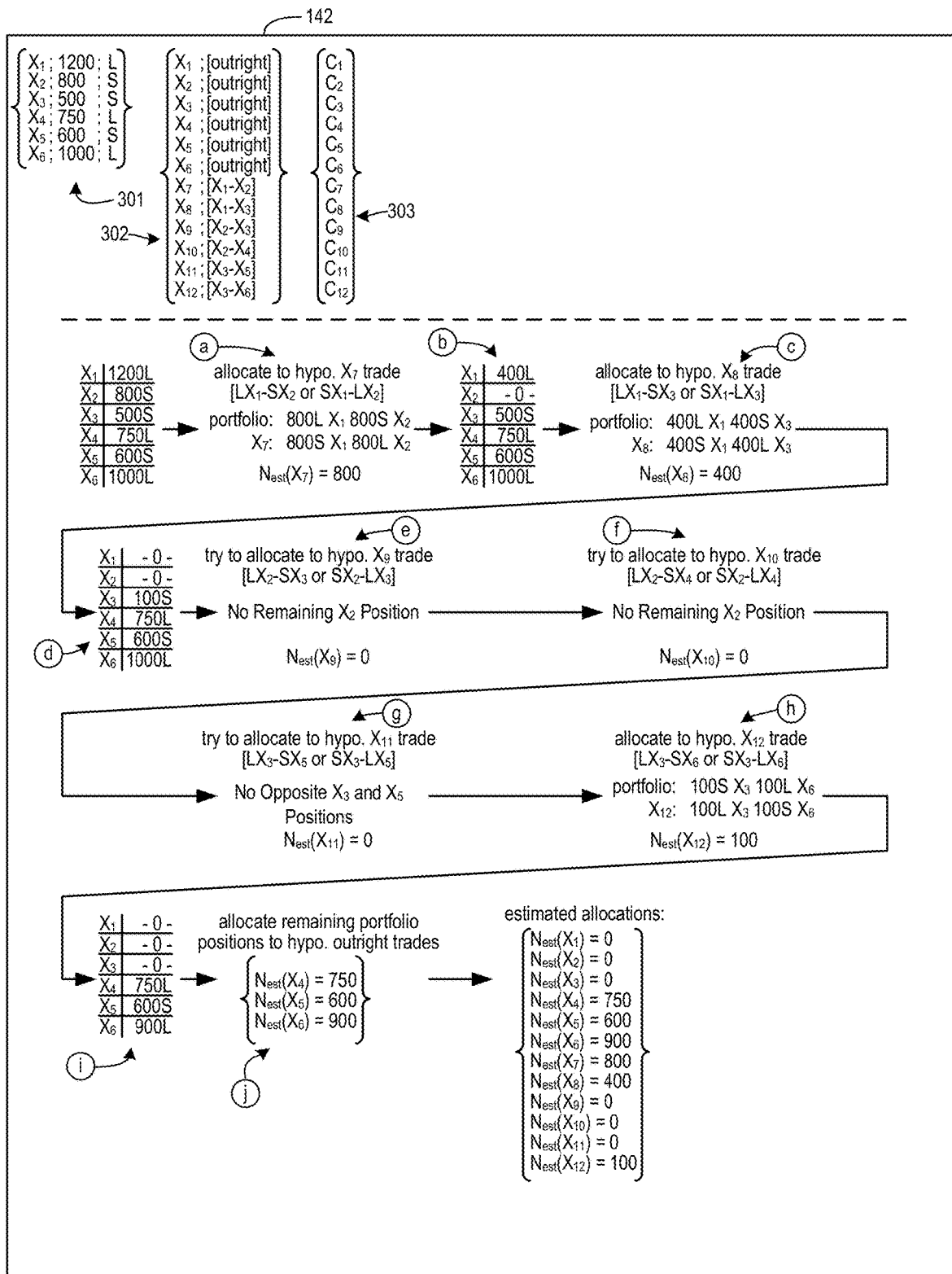
FIG. 5 shows operations performed by a computer system module in some embodiments when estimating an allocation of portfolio positions to products in a liquidation set.

FIG. 5 shows operations performed by module 142 in some embodiments, as part of step 203 of FIG. 2 and with regard to portfolio P1, when estimating an allocation of portfolio P1 positions to the products in the liquidation set. Although not shown in FIG. 5, module 142 orders each of spread-traded products $X_7$ through $X_{12}$ based on their corresponding liquidation cost functions $C_7$ through $C_{12}$, resulting in a ranking of products $X_7$ through $X_{12}$ from lowest corresponding liquidation cost function unit value to highest corresponding liquidation cost function unit value. In some embodiments, a unit value for a spread-traded product liquidation cost function may be the value of that function corresponding to the notional value of a single instance of a leg product. For example, products $X_7$-$X_{12}$ could be ordered by calculating values for $C_7$ ($1,000,000), $C_8$ ($1,000,000), $C_9$ ($1,000,000), $C_{10}$ ($1,000,000), $C_{11}$ (1,000,000), and $C_{12}$ ($1,000,000), ordering the functions from lowest to highest resulting values, and then ordering products $X_7$-$X_{12}$ based on the ordering of the functions. For simplicity, the example of FIG. 5 assumes that the ordering of products $X_7$ through $X_{12}$ based on the unit size their corresponding liquidation cost functions is the same as the numerical order of the subscripts identifying those products (e.g., $C_7$ (1000000)<$C_8$ (1000000)<$C_9$ (1000000)<$C_{10}$ (1000000)<$C_{11}$ (1000000) <$C_{12}$ (1000000)).

After ordering the spread-traded products, and as shown at step a, module 142 attempts to allocate portfolio P1 positions to product $X_7$, to the maximum extent possible, without increasing any portfolio positions. As part of step a, module 142 first determines if any allocation to product $X_7$ is possible by evaluating whether the portfolio has remaining (not yet allocated) oppositely-sided positions in the $X_7$ leg products. In this example, portfolio P1 has a remaining $1200 million long $X_1$ position and a remaining $800 million short $X_2$ position, so allocation to a hypothetical $X_7$ product trade can proceed. Because an $X_7$ product instance includes equal-sized positions in the leg products, the smaller of the remaining $X_1$ and $X_2$ positions is chosen as the size of the allocation. If the larger of the remaining $X_1$ and $X_2$ positions were chosen as the size of the allocation to product $X_7$, it would be necessary to first (hypothetically) increase the portfolio short position in product $X_2$ to $1,200,000.

At the conclusion of step a, all of the $X_2$ position and $800 million of the $X_1$ position have been allocated to a hypothetical trade in product $X_7$. This is represented in FIG. 5 as $N_{est}(X_7)=800$. As shown at step b, the remaining portfolio positions are updated to reflect this allocation. A similar sequence occurs at step c, resulting in allocating the remaining $X_1$ position and $400 million of the $X_3$ position to a hypothetical trade in product $X_8$ ($N_{est}(X_8)=400$), and at step d, resulting in further updating of the remaining portfolio P1 positions. At step e, a zero allocation to product $X_9$ occurs ($N_{est}(X_9)=0$), as there is no remaining portfolio position to allocate to the $X_2$ leg of $X_9$. At step f, a zero allocation to product $X_{10}$ occurs ($N_{est}(X_{10})=0$), as there is no remaining portfolio position to allocate to the $X_2$ leg of $X_{10}$. At step g, a zero allocation to product $X_{11}$ occurs ($N_{est}(X_{11})=0$), as there are not opposite remaining portfolio positions in the $X_3$ and $X_5$ legs of $X_{11}$. At step h, the remaining $100 million short $X_3$ position and $100 million of the remaining $1,000 million long $X_6$ position are allocated to a hypothetical trade in product $X_{12}$ ($N_{est}(X_{12})=100$). The remaining positions are updated (step i) and then allocated to hypothetical outright trades in the corresponding products (step j). After step j, and as shown in FIG. 5, estimated allocations of all portfolio P1 positions have been made to products in the liquidation set. This allocation is estimated because, as described below, it is may not be the final allocation and may only be used to assist calculation of an optimized allocation. The estimated liquidation cost $LC_{est}$ associated with a set of estimated allocations $N_{est}(X_1)$ through $N_{est}(X_k)$ can be calculated using Equation 3.

$$LC_{est} = \sum_{I=1}^{K} C_I(N_{est}(X_I))$$

Equation 3

Figure 6:
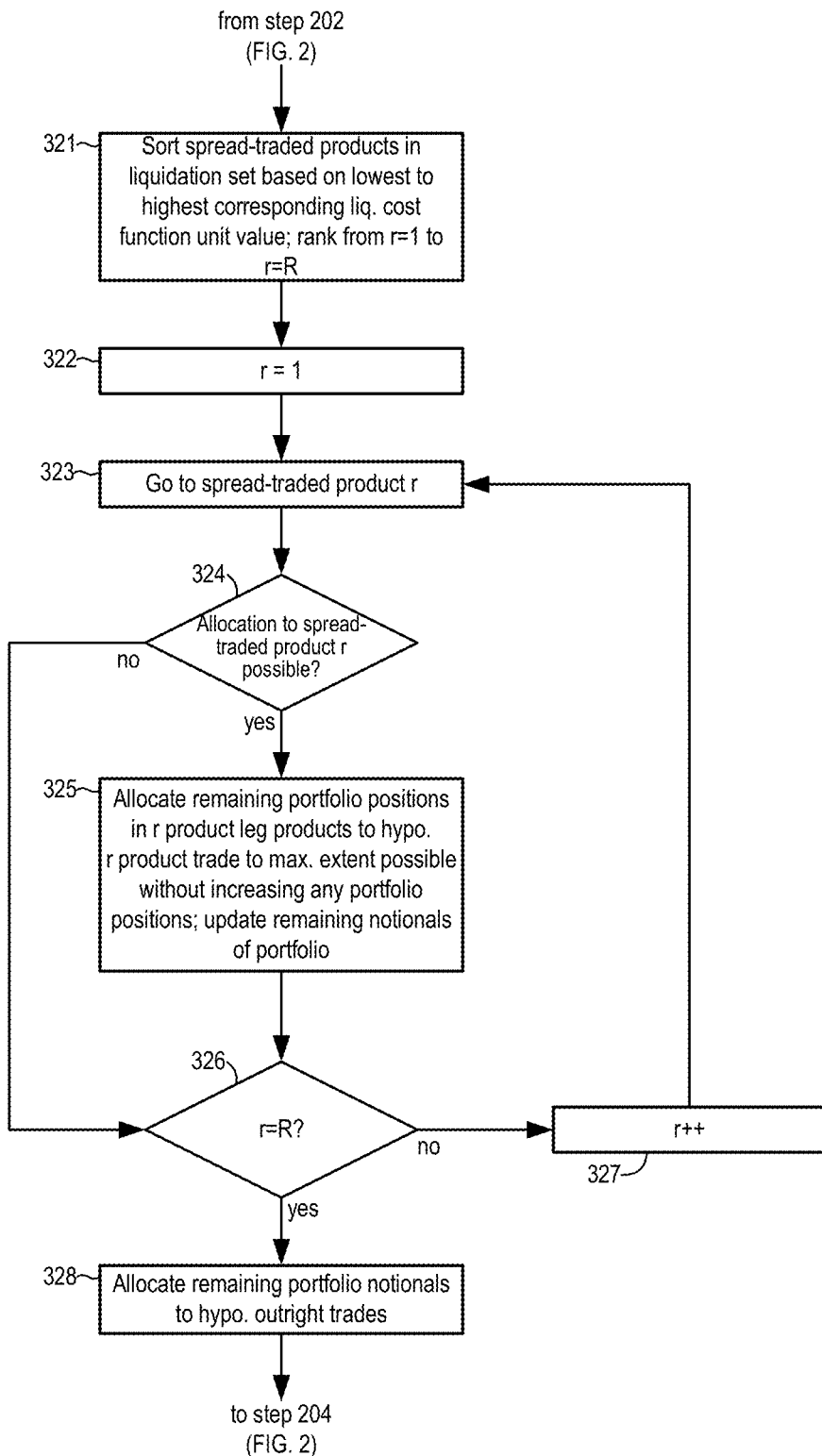
FIG. 6 is a flow chart showing operations performed by a computer system module in some embodiments when estimating an allocation of portfolio positions to products in a liquidation set.

FIG. 6 is a flow chart summarizing operations performed by module 142 of computer system 100 in embodiments such as the example described in FIG. 5. The steps of FIG. 6 may form step 203 of FIG. 2. In step 321, the spread trade products in the liquidation set are sorted based on lowest corresponding liquidation cost function unit value to highest corresponding liquidation cost function unit value, and are ranked from r=1 (lowest) to r=R (highest). In step 322, a counter for r is initialized to 1. In step 323, module 142 begins consideration of spread-traded product r. In step 324, module 142 determines if allocation to spread-traded product r is possible (i.e., if there are remaining appropriately-sided portfolio positions in the leg products of product r). If not, module 142 proceeds to step 326, described below. If allocation is possible, module 142 proceeds to step 325 and allocates remaining portfolio positions to a hypothetical trade in spread-traded product r to the maximum extent possible without increasing any portfolio positions. That maximum allocation will be the smallest remaining portfolio interest in one of the r product leg products. As part of step 325, values of remaining portfolio interests are updated. In step 326, module 142 determines if r=R. If not, module 142 increments the r counter by 1 at step 327 and returns to step 323. If r=R at step 326, module 142 proceeds to step 328 and allocates any remaining portfolio positions to hypothetical trades in appropriate outright-traded products.

Figure 7:
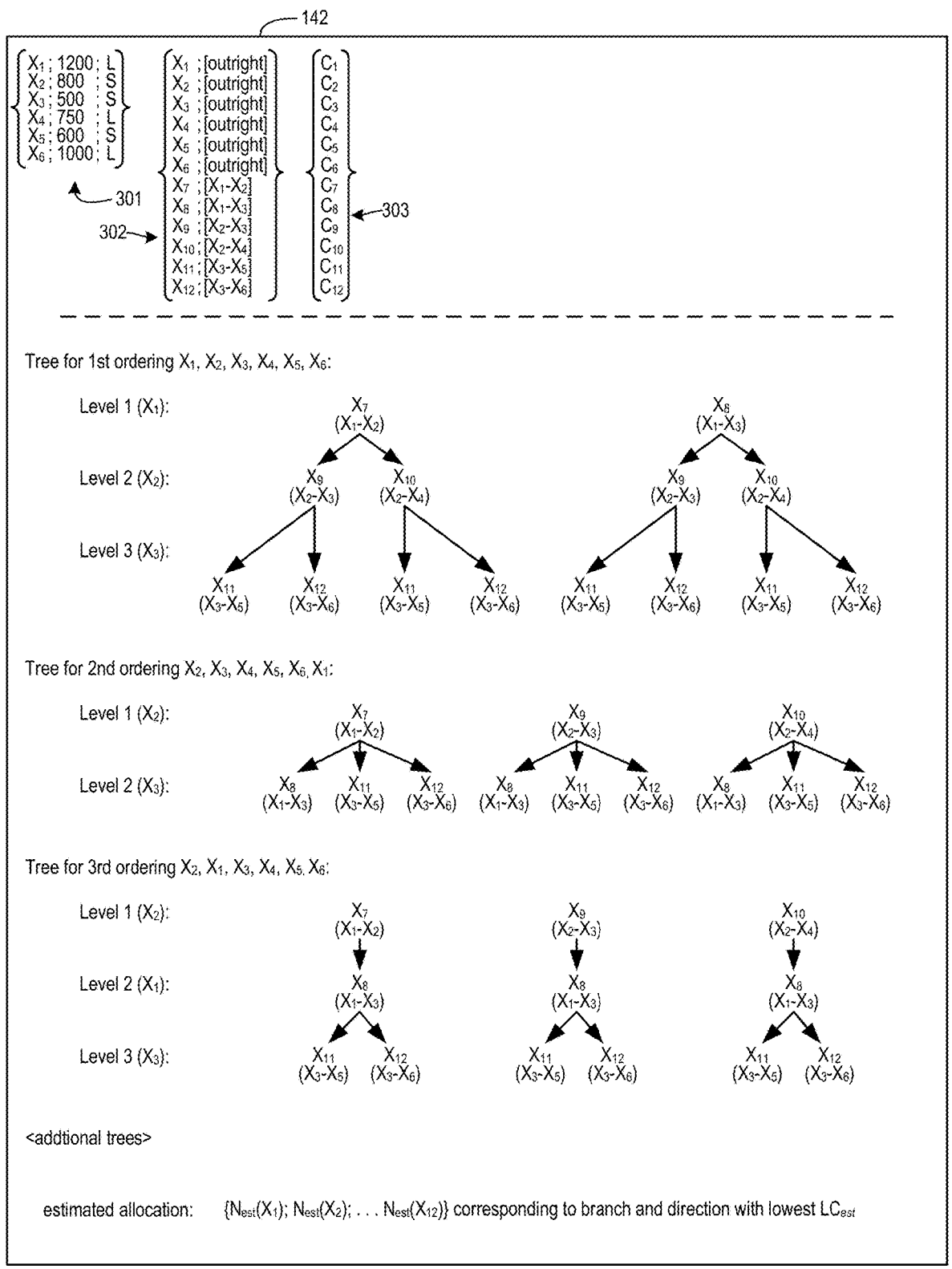
FIG. 7 shows operations performed by a computer system module in some additional embodiments when estimating an allocation of portfolio positions to products in a liquidation set.

FIG. 7 shows operations performed by module 142, in some alternate embodiments, instead of the operations described in connection with FIGS. 5 and 6. Although not shown in FIG. 7, module 142 first generates multiple orderings of the portfolio products $X_1$ through $X_6$. Three such orderings are shown in FIG. 7: a first ordering $X_1, X_2, X_3, X_4, X_5, X_6$, a second ordering $X_2, X_3, X_4, X_5, X_6, X_1$, and a third ordering $X_2, X_1, X_3, X_4, X_5, X_6$. However, additional orderings may be included. In some embodiments, module 142 might generate all possible orderings of products $X_1$ through $X_6$. Because this might ultimately result in extensive computations for portfolios with positions in numerous products, however, procedures may be implemented to limit the number of orderings generated. Examples of such procedures are provided below.

For each generated ordering of portfolio products, module 142 generates a search tree. The following discussion of FIG. 7 only discusses the search tree associated with the first ordering ($X_1, X_2, X_3, X_4, X_5, X_6$). For convenience, this tree is referred to as the "first tree." The search trees associated with the second ordering, the third ordering and any other orderings can be generated in a manner similar to that described in connection with the first tree.

The first level nodes of the first tree include all spread-traded products in the liquidation set that include the first portfolio product in the first ordering as one of the leg products. In the case of the first tree, the first portfolio product in the first ordering is $X_1$ and the first level nodes consist of products $X_7$ (leg products $X_1$ and $X_2$) and $X_8$ (leg products $X_1$ and $X_3$). The second level of the first tree includes all spread-traded products in the liquidation set that include the second portfolio product in the first ordering as one of the leg products, but exclude any spread-traded product in the liquidation set that includes a lower ordered portfolio product as a leg product. In the case of the first tree, the second portfolio product in the first ordering is $X_2$ and the second level thus consists of products $X_9$ (leg products $X_2$ and $X_3$) and $X_{10}$ (leg products $X_2$ and $X_4$). Product $X_7$ is excluded from the second level because it includes a lower ordered portfolio product ($X_1$) as one of its leg products. All of the second level products are added as nodes from each of the first level nodes. The third level of the first tree includes all spread-traded products in the liquidation set that include the third portfolio product in the first ordering as a leg product, but excludes any spread-traded product in the liquidation set that includes a lower ordered portfolio product as a leg product. In the case of the first tree, the third portfolio product in the first ordering is $X_3$ and the third level thus consists of products $X_{11}$ (leg products $X_3$ and $X_5$) and $X_{12}$ (leg products $X_3$ and $X_6$). Products $X_8$ and $X_9$ are excluded from the third level because each includes a lower ordered portfolio product ($X_1$ or $X_2$) as a leg product. All of the third level products are added as nodes from each of the second level nodes.

A similar pattern would then be followed for each of the other portfolio products based on the position of each remaining product in the first ordering. In the present example, however, this pattern results in no additional levels for the first tree. The only spread-traded products in the liquidation set that include the fourth product of the first ordering is product $X_{10}$. However, that product would be excluded from the fourth level because it includes a lower-ordered portfolio product ($X_2$) as a leg product. A similar result occurs with regard to the fifth and sixth portfolio products ($X_5$ and $X_6$) in the first ordering.

After generating all the search trees, module 142 then allocates the portfolio products by progressing through each branch of each tree in both directions. During a pass (or "traverse") through a branch, module 142 allocates portfolio positions by hypothetically liquidating an entire portfolio position in a product at each level of the tree, even if that results in a hypothetical increase in a position in another product. The product for which a position is completely liquidated at each tree level is the portfolio product associated with that level.

In the example of FIG. 6, and in a downward pass through the first branch of the first tree, module 142 determines a first set of interim estimated allocations. At the beginning of this pass, module 142 would first allocate portfolio positions by completely allocating the position in the portfolio product associated with level 1 ($X_1$) to a hypothetical trade in the spread-traded product ($X_7$) at the level 1 node in the first branch, resulting in $N_{est\text{-}int1}(X_7)$ of 1200. The portfolio only has an $800 million short position in the other $X_7$ leg product ($X_2$), however, and the actual portfolio $X_2$ position would need to be increased by $400 million (short) if this $X_7$ trade were actually carried out. Because the estimated allocation ultimately resulting from step 203 (FIG. 2) will be used as an approximation to narrow a subsequent optimization algorithm, however, this is permitted. Module 142 would then proceed to the second tree level and completely allocate the position in the portfolio product associated with level 2 ($X_2$) to a hypothetical trade in the spread-traded product ($X_9$) at the level 2 node in the first branch. Because the position in product $X_2$ has already been liquidated, however, no allocation occurs. Module 142 would then proceed to the third tree level and completely allocate the position in the portfolio product associated with level 3 ($X_3$) to a hypothetical trade in the spread-traded product ($X_{11}$) at the level 3 node in the first branch, resulting in $N_{est\text{-}int1}(X_{11})$ of 500. The portfolio has a $600 million short position in the other $X_{11}$ leg product ($X_5$), however, and actually executing this $X_{11}$ trade would imply first increasing the initial portfolio $X_5$ position to $1100 million (short). Again, this would be permitted. Because the third node is the last in the branch, module 142 would allocate the remaining portfolio positions to hypothetical outright trades, resulting in a first set of interim estimated allocations (in millions of $US) of $\{N_{est\text{-}int1}(X_1)=0;\ N_{est\text{-}int1}(X_2)=0;\ N_{est\text{-}int1}(X_3)=0;\ N_{est\text{-}int1}(X_4)=750;\ N_{est\text{-}int1}(X_5)=600;\ N_{est\text{-}int1}(X_6)=1000;\ N_{est\text{-}int1}(X_7)=1200;\ N_{est\text{-}int1}(X_8)=0;\ N_{est\text{-}int1}(X_9)=0;\ N_{est\text{-}int1}(X_{10})=0;\ N_{est\text{-}int1}(X_{11})=500;\ N_{est\text{-}int1}(X_{12})=0\}$.

Module 142 would then obtain a second set of interim estimated allocations by performing a similar procedure in a pass in the reverse direction on the first path ($X_{11}$, $X_9$, $X_7$), a third set of interim estimated allocations by performing a similar procedure in a pass down the second path of the first tree ($X_7$, $X_9$, $X_{12}$), a fourth set of interim estimated allocations by performing a similar procedure in a pass up the second path of the first tree ($X_{12}$, $X_9$, $X_7$), etc., until all paths of all trees have been traversed in both directions. For each set of interim estimated allocations, module 142 also calculates a liquidation cost using Equation 3. The set of interim estimated allocations corresponding to the lowest liquidation cost is then provided, as the result of step 203 (FIG. 2), to step 204.

Figure 8:
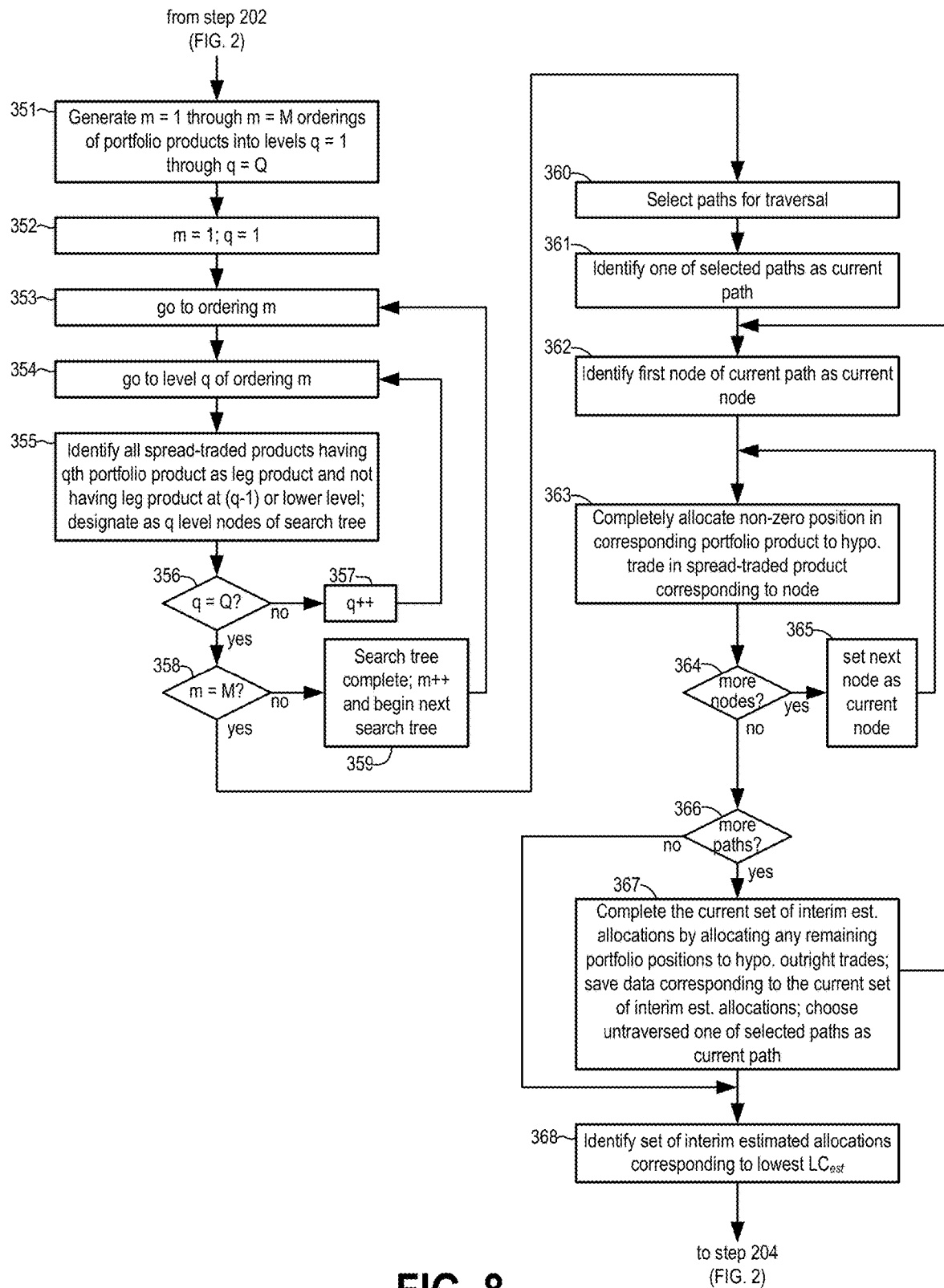
FIG. 8 is a flow chart showing operations performed by a computer system module in some additional embodiments when estimating an allocation of portfolio positions to products in a liquidation set.

FIG. 8 is a flow chart summarizing operations performed by module 142 of computer system 100 in embodiments such as the example described in FIG. 7. The steps of FIG. 8 may form step 203 of FIG. 2. In step 351, module 142 generates M orderings of the portfolio products into Q rankings, where Q is the number of products represented in the portfolio. Each of the M orderings will subsequently be used to generate a search tree. In some embodiments, the M orderings are all possible orderings. In other embodiments, and as discussed below, the number of orderings is limited.

In step 352, module 142 initializes the ordering counter m and the ranking counter q to 1. In step 353, module 142 begins generating a search tree for product ordering m. In step 354, module 142 begins generating a level of that search tree associated with the portfolio product having ranking q in ordering m. In step 355, module 142 identifies all spread-traded products in the liquidation set that include the q-ranked portfolio product as a leg product, but excludes all spread-traded products that include portfolio products have a ranking less than q. If there are any resulting spread-traded products, they are then designated as the nodes of the current level of the search tree. If the current level is the first level, those resulting products form a single set of nodes. If the current level is after the first level, those resulting products form a separate set of nodes descending from each of the nodes in the previous level. If there are no resulting products, no nodes are added.

Module 142 then proceeds to step 356 and determines if q=Q. If not, module 142 increments q by 1 (step 357) and then returns to step 354. If q=Q, module 142 proceeds to step 358 and determines if m=M. If not, module 142 proceeds to step 359, stores data indicating the current search tree is complete, and then returns to step 353 to begin generating the next search tree. If m=M, module 142 proceeds to step 360.

In step 360, module 142 selects the search tree paths that will be traversed to generate interim estimated allocations. In some embodiments, module 142 selects each direction through every branch of every tree. In other embodiments, and as also discussed below, the number of selected paths is more limited. In step 361, module 142 identifies one of the paths selected in step 360 as the current path. In step 362, module 142 identifies the first node of the current path as the current node. In step 363, module 142 completely allocates any non-zero position in the portfolio product corresponding to the tree level of the current node to a hypothetical trade in the spread-traded product corresponding to the current node. In step 364, module 142 determines if there are more nodes in the current path. If so, module 142 selects the next node in the current path as the current node (step 365) then returns to step 363. If not, module 142 proceeds to step 366 and determines if there are more selected paths (from step 360) for which a set of interim estimated allocations has yet to be determined. If so, module 142 goes to step 367. In step 367, module 142 completes the current set of interim estimated allocations by allocating any remaining portfolio positions to hypothetical outright trades in the appropriate portfolio products, saves data corresponding to the current set of interim estimated allocations, and chooses an untraversed one of the selected paths (i.e., a selected path for which a set of interim estimated allocations has not yet been determined) as the current path. From step 367, module 142 then returns to step 362.

If module 142 determines in step 366 that there are no more paths for which a set of interim estimated allocations has yet to be determined, module 142 proceeds to step 368. In step 368, module 142 identifies the set of interim estimated allocations corresponding to the lowest estimated liquidation cost. That set of interim estimated allocations is then selected as the set of estimated allocations $N_{est}(X_1)$ through $N_{est}(X_k)$ and provided to step 204 (FIG. 2).

Generating all possible orderings of portfolio products, and then generating interim allocations based on passes (in both directions) through every branch of every tree, could result in extensive computations for portfolios with positions in numerous products. Even if this is performed, however, there is no assurance that one of the resulting sets of allocations would be optimal. Because the set of estimated allocations is used as a starting point for further optimization, limiting the number of orderings and/or number of branches considered may be appropriate.

In some embodiments, step 351 includes procedures to limit the number of orderings. As but one example of such procedures, module 142 could identify a subset of W products in the portfolio having the largest total notional values (where W is a predetermined value, e.g., 5). Module 142 could then generate all possible orderings of those subset products (for a total of W ! orderings), and to each of those orderings append the remaining portfolio products in the same order. Other procedures could be implemented. Similarly, step 360 in some embodiments may include procedures to limit the number of branches traversed. As but one example, module 142 might randomly select a predetermined number (or predetermined percentage up to a maximum number) of the available branches.

After obtaining a set of estimated allocations in step 203 (FIG. 2), module 142 performs calculations to determine a set of optimized allocations in step 204. Like the set of estimated allocations of step 203, a set optimized allocations will reflect hypothetical trades in spread-traded and outright-traded products necessary to completely liquidate the portfolio. As used herein, an "optimized" allocation is not necessarily the absolute best possible allocation that results in the lowest possible liquidation cost (although it might be). Instead, an optimized allocation is one that is calculated using analytical tools that are more likely to provide the best possible solution.

As part of optimization step 204, and for a portfolio to which the data in Data Arrays 1 through 3 applies, module 142 creates Equations 4 through 5-j.

$$LC = \sum_{i=1}^{k} C_i(N(X_i)), \text{ where } LC, C_i, \text{ and } N(X_i) \text{ have the} \quad \text{Equation 4}$$

meanings explained above in connection wtih Equation 2.

$$N_P(X_1) = N(X_1) + N([S-T:X_1]_1) + \ldots + N([S-T:X_1]_n), \quad \text{Equation 5-1}$$

-continued wherein $N_P(X_1)$ is the portfolio position in product $X_1$, and where $[S-T:X_1]_1$ through $[S-T:X_1]_n$ are all of the spread-traded products from the liquidation set that included $X_1$ as a leg product;

"$n$" in Equation 5-1 will not necessarily have the same value as "$n$" in other Equation 5.

$$\vdots$$

NOTE: there will be a separate Equation 5, similar in form to Equations 5-1 and 5-$j$, for each of portfolio products $X_1$ through $X_j$.

$$\vdots$$

$$N_P(X_j) = N(X_j) + N([S-T:X_j]_1) + \ldots + N([S-T:X_j]_n), \quad \text{Equation 5-}j$$

wherein $N_P(X_j)$ is the portofolio position in product $X_j$, and where $[S-T:X_j]_1$ through $[S-T:X_j]_n$ are all of the spread-traded products from the liquidataion set that include $X_j$ as a leg product;

"$n$" in Equation 5-$j$ will not necessarily have the same value as "$n$" in other Equation 5.

Equations 5-1 through 5-j describe a constraint to Equation 4. Specifically, Equations 5-1 through 5-j impose a requirement that the portfolio be completely liquidated. Using the example of portfolio P1, module 142 would generate the equations shown in Table 3.

TABLE 3

| No. | Eq. |
| --- | --- |
| 4 | $LC = \sum_{i=1}^{12} C_i(N(X_i))$ |
| 5-1 | $1200M = N(X_1) + N(X_7) + N(X_8)$ |
| 5-2 | $800M = N(X_2) + N(X_7) + N(X_9) + N(X_{10})$ |
| 5-3 | $500M = N(X_3) + N(X_8) + N(X_9) + N(X_{11}) + N(X_{12})$ |
| 5-4 | $750M = N(X_4) + N(X_{10})$ |
| 5-5 | $600M = N(X_5) + N(X_{11})$ |
| 5-6 | $1000M = N(X_6) + N(X_{12})$ |

After creating Equations 4 through 5-j, module 142 determines values for each of $N(X_1)$ through $N(X_k)$ in Equation 4, while applying the constraints of Equations 5-1 through 5-j, that result in the lowest value LC. Any of numerous known optimization algorithms can be used in conjunction with an optimization based on Equations 4 through 5-j. Such algorithms include, without limitation, interior point optimization algorithms and active set optimization algorithms. To speed convergence of the optimization algorithm, the set of estimated allocations $N_{est}(X_1)$ through $N_{est}(X_k)$ from step 203 are used as seed values to initialize the optimization algorithm and narrow the range of possible allocations to be searched.

In step 205, module 142 determines if a set of allocations having a liquidation cost LC (calculated using Equation 4) less than $LC_{est}$ has been found. The quantity $LC_{est}$ in step 205 represents the liquidation cost associated with the set of estimated allocations $N_{est}(X_1)$ through $N_{est}(X_k)$ from step 203 and is calculated from those estimated allocations using Equation 3. In some circumstances, for example, an optimization algorithm may not converge to a solution. If module 142 determines a set of allocations having a liquidation cost LC less than $LC_{est}$ was not found in step 204, module 142 designates $LC_{est}$ as $LC_{opt}$ (step 206) and proceeds to step 208. If module 142 determines a set of allocations having a liquidation cost LC less than $LC_{est}$ was found in step 204, module 142 designates that LC as $LC_{opt}$ (step 206) and proceeds to step 208.

In step 208 module 140 determines an amount of a performance bond (or a performance bond component) based on $LC_{opt}$ and outputs data indicating that amount. That data may also be transmitted to an appropriate party for use in verifying that the portfolio holder has sufficient funds or other assets on deposit and/or to obtain additional funds or assets from the portfolio holder.

Figure 9:
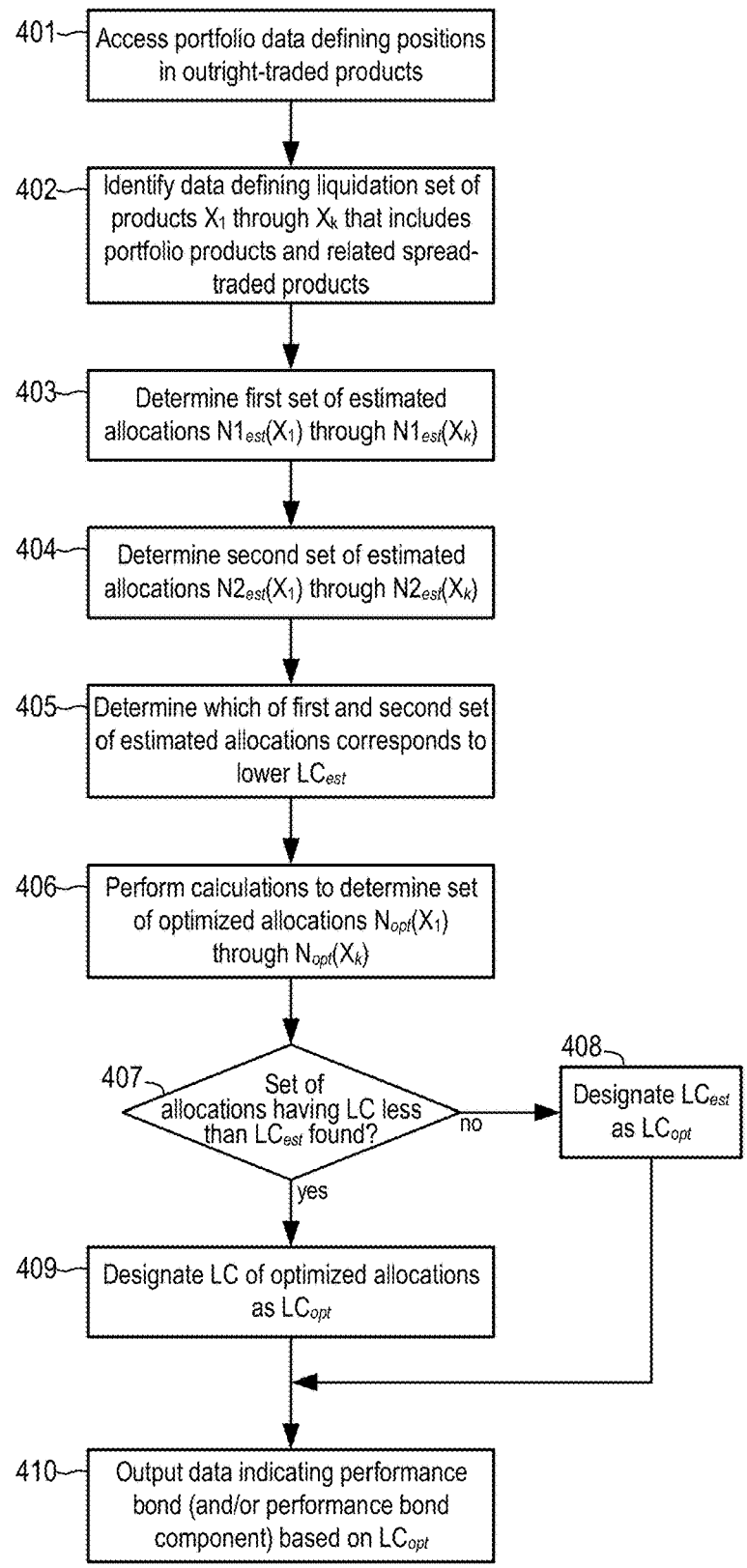
FIG. 9 is a flow chart of a method according to some further embodiments.

Embodiments include additional variations on the procedures outlined above. In some embodiments, for example, two techniques are utilized to determine sets of estimated allocations. The set of estimated allocations having the lower estimated liquidation cost is then used in an optimization step. FIG. 9 is a flow chart of a method according to one such embodiment. Steps 401, 402, and 406 through 410 are respectively similar to steps 201, 202, and 204 through 208 of FIG. 2. However, step 203 of the FIG. 2 method has been replaced with steps 403, 404 and 405. In step 403, module 142 determines a first set of estimated allocations $N1_{est}(X_1)$ through $N1_{est}(X_k)$ using the method described in connection with FIG. 6. In step 404, module 142 determines a second set of estimated allocations $N2_{est}(X_1)$ through $N2_{est}(X_k)$ using the method described in connection with FIG. 8. In step 405, module 142 determines which of the first or second sets of estimated allocations corresponds to a lower estimated liquidation cost and provides that set of estimated allocations as an input to step 406.

In some embodiments, a portfolio may include positions in products having notionals defined in different ways. For example, total notional amounts of positions in a first group of the portfolio products might be quantities of a first currency, total notional amounts of positions in a second group of the portfolio products might be quantities of a second currency, and total notional amounts of positions in a third group of the portfolio products might be quantities of a commodity. The above described procedures can be adapted to such a portfolio in various ways. As but one example, liquidation cost functions for the second group of portfolio products and related spread-traded products can be modified (e.g., through use of a current first currency to second currency exchange rate) to output a cost in terms of the first currency. Similarly, liquidation cost functions for the third group of portfolio products and related spread-traded products can be modified (e.g., through use of a current spot trading rate) to output a cost in terms of the first currency.

Conclusion

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A computer implemented method comprising:
identifying, by the computer system in a data structure coupled therewith which stores data indicative of a portfolio of positions in at least a first subset of a plurality of outright-traded products, a set of positions in a second subset of products counter to one or more of the positions of the portfolio which would offset those one or more positions of the portfolio, the second subset being selected from the plurality of outright-traded products and/or a plurality of spread-traded products each formed by a combination of two or more of the plurality of outright-traded products, wherein each of the positions in the second subset is associated with an estimated effect on a cost to obtain that position;
determining, by the computer system, a subset of the set of positions which offsets the most positions in the portfolio while having a lowest cumulative cost to obtain those positions, the determining including reducing a number of combinations of the positions in the second subset to evaluate by:
determining, by the computer system, a set of estimated allocations of the positions of the portfolio in each of the plurality of outright-traded products among each of the positions in the second subset; and
determining, iteratively by the computer system using the set of estimated allocations and the effect on the cost to obtain the position associated with each position of the second subset therein, the estimated allocation of the set of estimated allocations that is characterized by a lowest cumulative effect on the cost to obtain those positions of the second subset therein; and
outputting, by the computer system, data indicating at least a portion of a performance bond based on the determined lowest cumulative effect on the cost to obtain those positions of the second subset therein.

2. The computer implemented method of claim 1, wherein the determining of the set of estimated allocations further comprises, for each estimated allocation:
ordering the one or more positions in spread-traded products in the set of positions based on the effect on the cost to obtain that position associated therewith;
progressing through each of the ordered one or more positions and allocating at least a portion of the positions in the portfolio to hypothetical trades in the spread-traded products of the ordered one or more positions; and
allocating any remainder of the positions in the portfolio to hypothetical outright trades.

3. The computer implemented method of claim 1, wherein the determining of the set of estimated allocations further comprises:
generating multiple search trees, each of the search trees having multiple branches;
determining an effect on a cost to obtain a position corresponding to each of at least a portion of the branches in at least a portion of the search trees; and
selecting a set of estimated allocations corresponding to the branch having a lowest corresponding effect on the cost to obtain the positions therein.

4. The computer implemented method of claim 1, wherein the determining of the set of estimated allocations further comprises, for each estimated allocation:
determining a first set of estimated allocations by ordering the positions in spread-traded products in the set of positions based on the effect on the cost to obtain that position associated therewith, progressing through each of the ordered positions and allocating at least a portion of the positions in the portfolio to hypothetical trades in the spread-traded products of the ordered positions, and allocating any remainder of the positions in the portfolio to hypothetical outright trades;
determining a second set of estimated allocations based on one or more search trees;
determining which of the first set of estimated allocations and the second set of estimated allocations corresponds to a lower effect on a cost to obtain a position; and
selecting as the estimated allocations the one of the first set of estimated allocations and the second set of estimated allocations determined to correspond to a lower effect on the cost to obtain the positions therein.

5. The computer implemented method of claim 1, wherein the determining of the set of estimated allocations further comprises inputting the estimated allocations as an initial condition for the determining of the estimated allocation of the set of estimated allocations that is characterized by the lowest effect on the cost to obtain the positions therein.

6. The computer implemented method of claim 5, wherein the determining of the estimated allocation of the set of estimated allocations that is characterized by lowest effect on the cost to obtain the positions therein further comprises:
computing an effect on the cost to obtain the positions for each estimated allocation of the set of estimated allocations based on the effect on the cost to obtain the position associated with each position of the set of positions therein, and iteratively comparing each computed effect on the cost to obtain the positions with a prior computed effect on the cost to obtain the positions to determine the lowest effect on the cost to obtain the positions.

7. The computer implemented method of claim 6, wherein the computing and comparing are performed until the least effect on the cost to obtain the positions of any of the set of estimated allocation is determined.

8. A non-transitory computer-readable media storing computer executable instructions that, when executed, cause a computer system to perform operations that include:
identifying, in a data structure coupled therewith which stores data indicative of a portfolio of positions in at least a first subset of a plurality of outright-traded products, a set of positions in a second subset of products counter to one or more of the positions of the portfolio which would offset those one or more positions of the portfolio, the second subset being selected from the plurality of outright-traded products and/or a plurality of spread-traded products each formed by a combination of two or more of the plurality of outright-traded products, wherein each of the positions in the second subset is associated with an estimated effect on a cost to obtain that position;
determining a subset of the set of positions which offsets the most positions in the portfolio while having a lowest cumulative cost to obtain those positions, the determining including reducing a number of combinations of the positions in the second subset to evaluate by:
  determining a set of estimated allocations of the positions of the portfolio in each of the plurality of outright-traded products among each of the positions in the second subset; and
  determining, iteratively using the set of estimated allocations and the effect on the cost to obtain the position associated with each position of the second subset therein, the estimated allocation of the set of estimated allocations that is characterized by a lowest cumulative effect on the cost to obtain those positions of the second subset therein; and
  outputting data indicating at least a portion of a performance bond based on the determined lowest cumulative effect on the cost to obtain those positions of the second subset therein.

9. The non-transitory computer-readable media of claim 8, wherein the determining of the set of estimated allocations further comprises, for each estimated allocation:
  ordering the one or more positions in spread-traded products in the set of positions based on the effect on the cost to obtain that position associated therewith;
  progressing through each of the ordered one or more positions and allocating at least a portion of the positions in the portfolio to hypothetical trades in the spread-traded products of the ordered one or more positions; and
  allocating any remainder of the positions in the portfolio to hypothetical outright trades.

10. The non-transitory computer-readable media of claim 8, wherein the determining of the set of estimated allocations further comprises:
  generating multiple search trees, each of the search trees having multiple branches;
  determining an effect on a cost to obtain a position corresponding to each of at least a portion of the branches in at least a portion of the search trees; and
  selecting a set of estimated allocations corresponding to the branch having a lowest corresponding effect on the cost to obtain the positions therein.

11. The non-transitory computer-readable media of claim 8, wherein the determining of the set of estimated allocations further comprises, for each estimated allocation:
  determining a first set of estimated allocations by ordering the positions in spread-traded products in the set of positions based on the effect on the cost to obtain that position associated therewith, progressing through each of the ordered positions and allocating at least a portion of the positions in the portfolio to hypothetical trades in the spread-traded products of the ordered positions, and allocating any remainder of the positions in the portfolio to hypothetical outright trades;
  determining a second set of estimated allocations based on one or more search trees;
  determining which of the first set of estimated allocations and the second set of estimated allocations corresponds to a lower effect on a cost to obtain a position; and
  selecting as the estimated allocations the one of the first set of estimated allocations and the second set of estimated allocations determined to correspond to a lower effect on the cost to obtain the positions therein.

12. The non-transitory computer-readable media of claim 8, wherein the determining of the set of estimated allocations further comprises inputting the estimated allocations as an initial condition for the determining of the estimated allocation of the set of estimated allocations that is characterized by the lowest effect on the cost to obtain the positions therein.

13. The non-transitory computer-readable media of claim 12, wherein the determining of the estimated allocation of the set of estimated allocations that is characterized by lowest effect on the cost to obtain the positions therein further comprises:
  computing an effect on the cost to obtain the positions for each estimated allocation of the set of estimated allocations based on the effect on the cost to obtain the position associated with each position of the set of positions therein, and iteratively comparing each computed effect on the cost to obtain the positions with a prior computed effect on the cost to obtain the positions to determine the lowest effect on the cost to obtain the positions.

14. The non-transitory computer-readable media of claim 13, wherein the computing and comparing are performed until the least effect on the cost to obtain the positions of any of the set of estimated allocation is determined.

15. A system comprising:
  at least one processor; and
  at least one non-transitory memory, wherein the at least one non-transitory memory stores instructions that, when executed, cause the computer system to:
  identify, in a data structure coupled with the processor which stores data indicative of a portfolio of positions in at least a first subset of a plurality of outright-traded products, a set of positions in a second subset of products counter to one or more of the positions of the portfolio which would offset those one or more positions of the portfolio, the second subset being selected from the plurality of outright-traded products and/or a plurality of spread-traded products each formed by a combination of two or more of the plurality of outright-traded products, wherein each of the positions in the second subset is associated with an estimated effect on a cost to obtain that position;
  determine a subset of the set of positions which offsets the most positions in the portfolio while having a lowest cumulative cost to obtain those positions, the determination including a reduction of a number of combinations of the positions in the second subset to evaluate by process which is further caused by the execution of the instructions to:
    determine a set of estimated allocations of the positions of the portfolio in each of the plurality of outright-traded products among each of the positions in the second subset; and
    determine, iteratively using the set of estimated allocations and the effect on the cost to obtain the position associated with each position of the second subset therein, the estimated allocation of the set of estimated allocations that is characterized by a lowest cumulative effect on the cost to obtain those positions of the second subset therein; and
    output data indicating at least a portion of a performance bond based on the determined lowest cumulative effect on the cost to obtain those positions of the second subset therein.

16. The system of claim 15, wherein to determine of the set of estimated allocations, for each estimated allocation the instructions are further executable by the processor to cause the processor to:

order the one or more positions in spread-traded products in the set of positions based on the effect on the cost to obtain that position associated therewith;

progress through each of the ordered one or more positions and allocate at least a portion of the positions in the portfolio to hypothetical trades in the spread-traded products of the ordered one or more positions; and allocate any remainder of the positions in the portfolio to hypothetical outright trades.

17. The system of claim 15, wherein to determine of the set of estimated allocations, for each estimated allocation the instructions are further executable by the processor to cause the processor to:

generate multiple search trees, each of the search trees having multiple branches;

determine an effect on a cost to obtain a position corresponding to each of at least a portion of the branches in at least a portion of the search trees; and select a set of estimated allocations corresponding to the branch having a lowest corresponding effect on the cost to obtain the positions therein.

18. The system of claim 15, wherein to determine of the set of estimated allocations, for each estimated allocation the instructions are further executable by the processor to cause the processor to:

determine a first set of estimated allocations by ordering the positions in spread-traded products in the set of positions based on the effect on the cost to obtain that position associated therewith, progressing through each of the ordered positions and allocate at least a portion of the positions in the portfolio to hypothetical trades in the spread-traded products of the ordered positions, and allocate any remainder of the positions in the portfolio to hypothetical outright trades;

determine a second set of estimated allocations based on one or more search trees;

determine which of the first set of estimated allocations and the second set of estimated allocations corresponds to a lower effect on a cost to obtain a position; and selects the estimated allocations the one of the first set of estimated allocations and the second set of estimated allocations determined to correspond to a lower effect on the cost to obtain the positions therein.

19. The system of claim 15, wherein the determination of the set of estimated allocations further comprises and input of the estimated allocations as an initial condition for the determination of the estimated allocation of the set of estimated allocations that is characterized by the lowest effect on the cost to obtain the positions therein.

20. The system of claim 19, wherein the determination of the estimated allocation of the set of estimated allocations that is characterized by lowest effect on the cost to obtain the positions therein further comprise a computation of an effect on the cost to obtain the positions for each estimated allocation of the set of estimated allocations based on the effect on the cost to obtain the position associated with each position of the set of positions therein, and iteratively comparing each computed effect on the cost to obtain the positions with a prior computed effect on the cost to obtain the positions to determine the lowest effect on the cost to obtain the positions.

21. The system of claim 20, wherein the computation and comparison are performed until the least effect on the cost to obtain the positions of any of the set of estimated allocation is determined.

* * * * *